United States Patent
Okada et al.

(10) Patent No.: US 7,039,274 B2
(45) Date of Patent: May 2, 2006

(54) LIGHT SIGNAL TRANSMITTING DEVICE AND SIGNAL PROCESSING DEVICE

(75) Inventors: Junji Okada, Ashigarakami-gun (JP); Takehiro Niitsu, Ashigarakami-gun (JP); Tsutomu Hamada, Ashigarakami-gun (JP); Masao Funada, Ashigarakami-gun (JP); Hidenori Yamada, Ashigarakami-gun (JP); Shinya Kyozuka, Ashigarakami-gun (JP); Tomo Baba, Ashigarakami-gun (JP); Shinobu Ozeki, Ashigarakami-gun (JP); Osamu Takanashi, Ashigarakami-gun (JP); Masaaki Miura, Ashigarakami-gun (JP)

(73) Assignees: Fuji Xerox Co., Ltd., Tokyo (JP); Fuji Photo Film Co., Ltd., Minami-Ashigara (JP)

( * ) Notice: Subject to any disclaimer, the term of this patent is extended or adjusted under 35 U.S.C. 154(b) by 137 days.

(21) Appl. No.: 10/695,828

(22) Filed: Oct. 30, 2003

(65) Prior Publication Data
US 2005/0100282 A1     May 12, 2005

(30) Foreign Application Priority Data
Jan. 22, 2003   (JP) .............................. 2003-013074

(51) Int. Cl.
   *G02B 6/26* (2006.01)
   *G02B 6/42* (2006.01)
(52) U.S. Cl. ..................... 385/31; 385/15; 385/18; 385/33; 385/46; 385/47; 385/48; 385/49; 385/50
(58) Field of Classification Search ............ 385/14–18, 385/20–24, 27–28, 31, 37, 46–50, 55
See application file for complete search history.

(56) References Cited

U.S. PATENT DOCUMENTS

| | | | | |
|---|---|---|---|---|
| 4,087,159 | A | * | 5/1978 | Ulrich .................... 385/129 |
| 5,099,357 | A | * | 3/1992 | Yokogawa et al. ........ 359/282 |
| 5,117,472 | A | | 5/1992 | Blyler, Jr. et al. |
| 5,166,993 | A | * | 11/1992 | Blyler et al. .............. 385/31 |
| 5,196,005 | A | * | 3/1993 | Doiron et al. ............. 606/7 |
| 5,586,209 | A | * | 12/1996 | Matsuura et al. .......... 385/45 |
| 5,742,717 | A | * | 4/1998 | Saitoh ..................... 385/46 |
| 5,745,619 | A | * | 4/1998 | Li et al. ................... 385/48 |

(Continued)

FOREIGN PATENT DOCUMENTS

EP     0 013 972 A1     8/1980

(Continued)

OTHER PUBLICATIONS

"Mode Mixing and Polarization Scrambling Microparticles in Polymeric Resin Filled Optical Couplers", Grimes, G., IEEE Transactions on Components, Hybrids, and Manufacturing Technology, vol. 16, No. 3, May 1993.*

(Continued)

*Primary Examiner*—Frank G. Font
*Assistant Examiner*—Ryan Lepisto
(74) *Attorney, Agent, or Firm*—Oliff & Berridge, PLC

(57) ABSTRACT

In a device of the present invention for allowing signal light to enter a light guide body using an optical fiber, a light guide body, which is constituted by dispersing particles for scattering the signal light in an optical medium, is selected as a light guide path which requires an area where a light diffusing function is performed just after incidence of the signal light. An optical connecting material intervenes between one end of the optical fiber from which the signal light is output and opposed one end surface of a particle dispersing light guide body and a desired diffusing function is obtained.

18 Claims, 13 Drawing Sheets

U.S. PATENT DOCUMENTS

| | | | |
|---|---|---|---|
| 6,081,632 A * | 6/2000 | Yoshimura et al. | 385/5 |
| 6,360,039 B1 * | 3/2002 | Bernard et al. | 385/33 |
| 6,735,368 B1 * | 5/2004 | Parker et al. | 385/122 |
| 6,788,863 B1 * | 9/2004 | Parker et al. | 385/122 |
| 6,792,213 B1 * | 9/2004 | Okada et al. | 398/142 |
| 6,878,925 B1 * | 4/2005 | Yamada et al. | 250/227.11 |
| 2003/0002773 A1 * | 1/2003 | Parker et al. | 385/15 |
| 2003/0012510 A1 * | 1/2003 | Steenbergen et al. | 385/50 |
| 2003/0224214 A1 * | 12/2003 | Garito et al. | 428/694 ML |
| 2003/0228096 A1 * | 12/2003 | Parker et al. | 385/27 |
| 2004/0067035 A1 * | 4/2004 | Parker et al. | 385/129 |
| 2004/0071405 A1 * | 4/2004 | Baney et al. | 385/50 |

FOREIGN PATENT DOCUMENTS

| | | |
|---|---|---|
| JP | A 57-56814 | 4/1982 |
| JP | A 59-91411 | 5/1984 |
| JP | A 61-196210 | 8/1986 |
| JP | A 2-41042 | 2/1990 |
| JP | A 10-123350 | 5/1998 |
| JP | A 2000-241655 | 9/2000 |

OTHER PUBLICATIONS

Translation of Hirota et al (JP 10-123350 A).*
Translation of Kyozuka (JP 2000-241655 A).*

* cited by examiner

F I G. 1
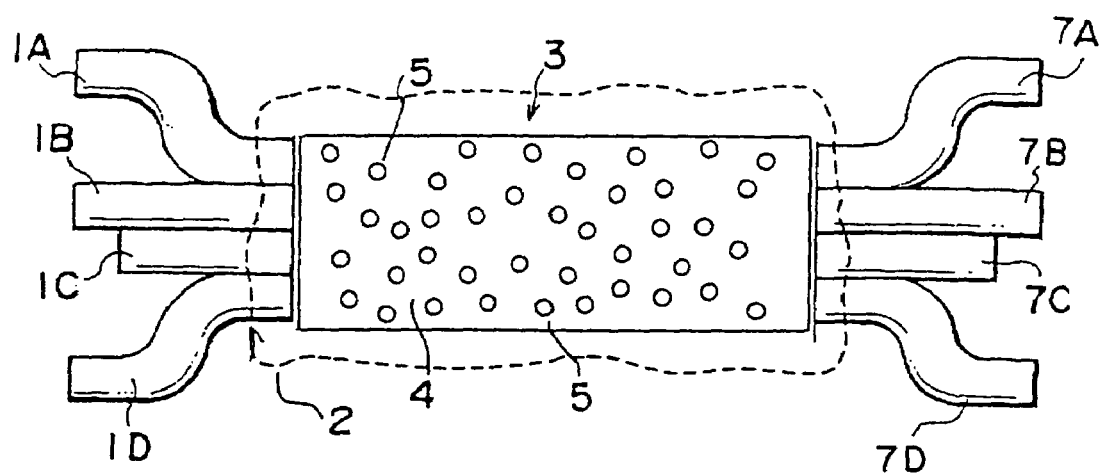

F I G. 5
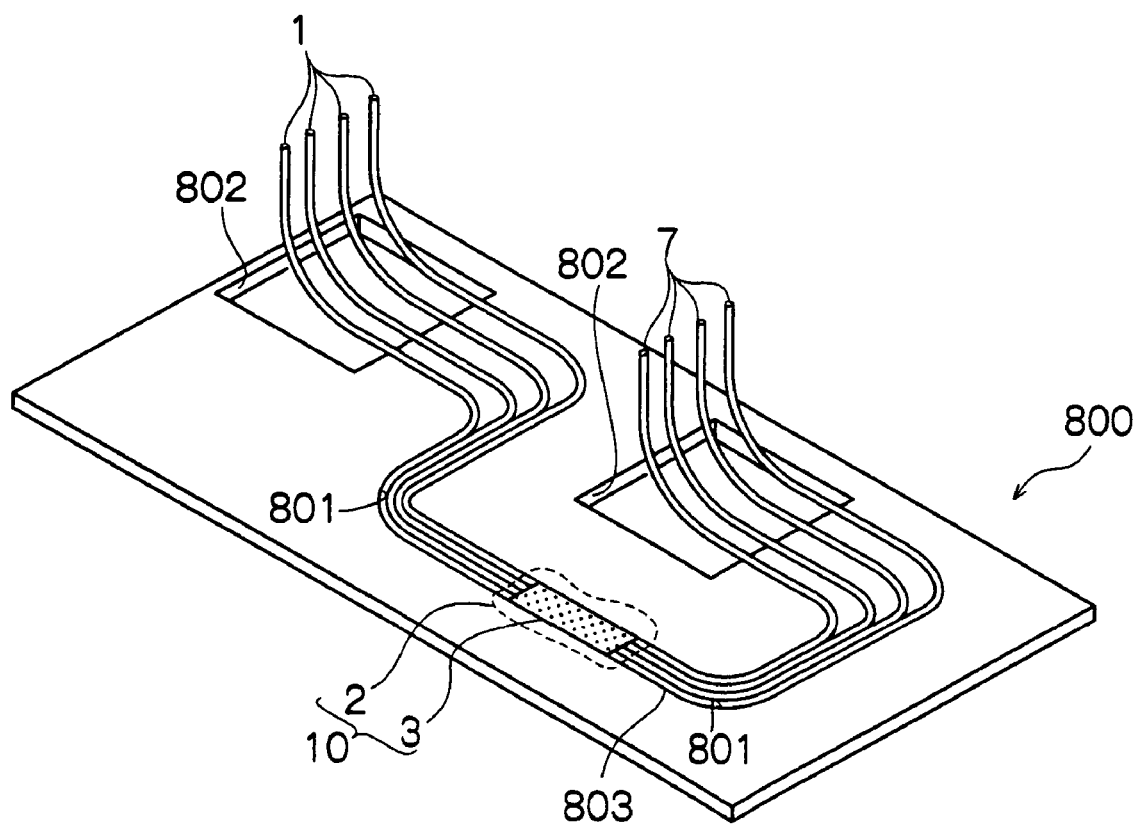

F I G. 6
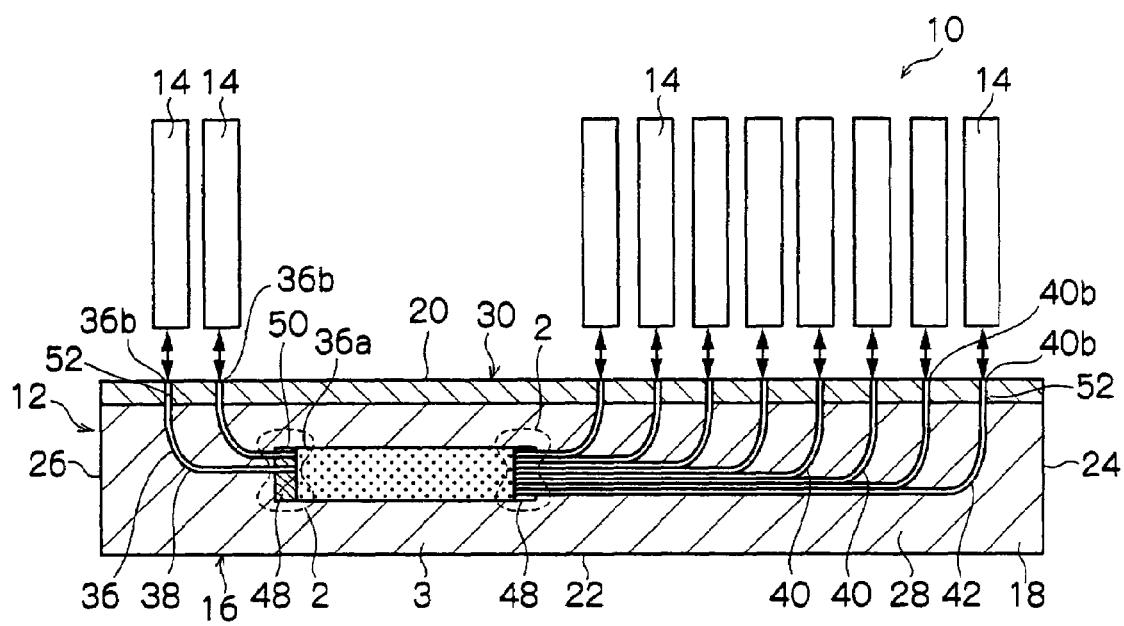

F I G. 7
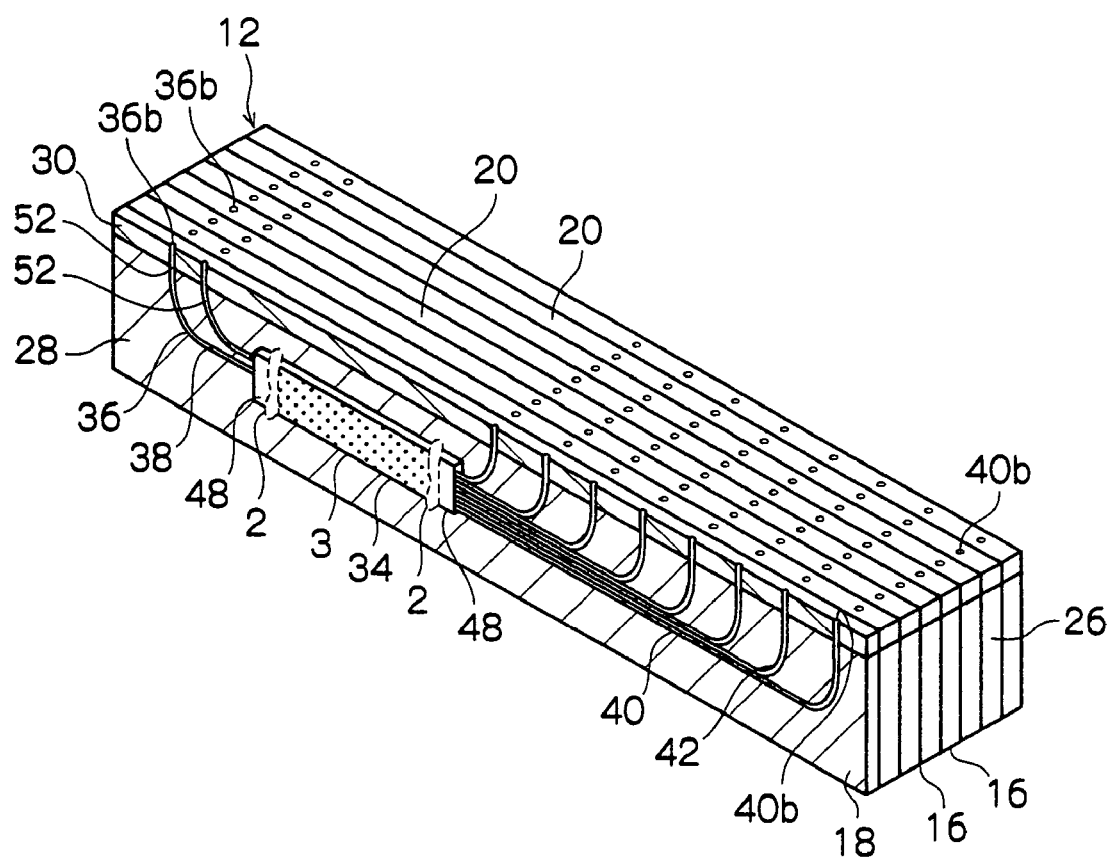

LIGHT SIGNAL TRANSMITTING DEVICE AND SIGNAL PROCESSING DEVICE

CROSS-REFERENCE TO RELATED APPLICATION

This application claims priority under 35 USC 119 from Japanese Patent Application No. 2003-13074, the disclosure of which is incorporated by reference herein.

BACKGROUND OF THE INVENTION

1. Field of the Invention

The present invention relates to a light signal transmitting device for transmitting a light signal between a plurality of circuit boards and between a plurality of devices, and a signal processing device composed of the light signal transmitting device.

2. Description of the Related Art

Conventionally, signals are generally received and transmitted between a plurality of circuit boards and between a plurality of devices via electrical connection. It is, however, hard for the electrical connection to cope with speed-increase of signal transmission due to skew between channels, crosstalk, increase in fan-out and the like.

Japanese Patent Application Laid-Open (JP-A) No. 2-41042 suggests a light data bus in which a light emitting/light receiving device is provided on both surfaces of each circuit board, and the light emitting/light receiving devices on the adjacent circuit boards are spatially connected by light.

Because this technique, however, requires optical-electrical conversion at every communication between the adjacent circuit boards, cost and latency increase, and because free space propagation is used, locating is difficult and the technique has a weakness for crosstalk, dust and the like.

Further, JP-A No. 61-196210 suggests a technique in which circuit boards are optically coupled with each other via an optical path composed of a diffraction grating and a reflecting element arranged on a surface of a plate.

In this technique, however, because light emitted from one point can be connected only with one fixed point, multiple connections cannot be carried out.

In view of such circumstances, JP-A No. 10-123350 suggests a signal processing device in which light scatterers having refractive index different from that of a light transmitting layer are dispersed in the light transmitting layer.

In this signal processing device, incident signal light is diffused by the light scatterers dispersed in the light transmitting layer, and the signal can be received and transmitted between arbitrary circuit boards optically connected with the light transmitting layer.

JP-A No. 2000-241655 discloses an optical coupler having a configuration where a transmission diffusing layer is formed on one end of an incident portion of the light transmitting layer and a plurality of optical fibers are brought into contact with the transmission diffusing layer.

A mode where a diffusing layer is used so as to diffuse incident light includes two typical modes. They are a mode in which a transmission diffusing layer is provided on an incident side of a light guide body, and a mode in which a reflection diffusing layer is provided on the other end of the light guide body. In the mode using the reflection diffusing layer, because the incident portion for the signal light is normally made of a flat light transmitting material, one ends of the optical fibers can be coupled with the light guide body by adhesive or the like. For example, when it is demanded that a length of the light guide body is shortened by performing a diffusing function just after incidence, an area for causing diffusion is required on the incident side for the signal light.

In the light signal transmitting device in which the transmission diffusing layer is provided on the incident portion disclosed in JP-A No. 2000-241655, because the incident light is refracted and diffused by fine irregularities formed on a surface of the transmission diffusing layer, it is necessary to lay an air layer in gaps between the optical fibers and the irregularities on the diffusing layer. That is to say, in principle, an adhesive material having refractive index smaller than that of the optical fibers or the diffusing layer can be provided to the gaps of the irregularities, but actually the adhesive material, which has refractive index small enough to an extent of maintaining diffusing properties, is expensive. Because option is limited, the air layer is laid and the optical fibers are physically fixed by using a holding member or the like. In this bumping structure, however, when a resin material such as adhesive for holding the optical fibers intrudes into the air layer portion corresponding to the gaps at the time of production, the diffusing function is deteriorated outstandingly.

In the light guide body in which diffusing particles are dispersed in the entire light guide body disclosed in JP-A No. 10-123350, particles representing the light diffusing function are present just after incidence. A light signal is emitted from one ends of the optical fibers, and the incident sides of the optical fibers are connected with the light guide body. As such a connecting method, however, an advantageous method is not disclosed.

SUMMARY OF THE INVENTION

It is, therefore, one objective of the present invention to improve performance and reliability in connection between an optical fiber, for allowing a light signal to enter a light guide body, and the light guide body for branching the incident light to many emitting portions utilizing diffusion.

In order to achieve the objective, a first aspect of the invention is a light signal transmitting device for allowing signal light entering from one end of at least one optical fiber on an incident side to enter a light guide body, and emitting the signal light towards a plurality of output nodes. The light guide body is constituted so that particles for scattering the signal light are dispersed in an optical medium, and includes a light transmitting connecting material for optically connecting the optical fiber with one end surface of the light guide body.

According to the invention, in a configuration using a light guide path which allows the signal light to enter the light guide body using the optical fiber and requires an area where a light diffusing function is performed just after incidence of the signal light, the light guide body, which is constituted so that the particles for scattering the signal light are dispersed in the optical medium, is selected as the light guide path. As a result, even when an optical connecting material is laid between one end of the optical fiber from which the signal light is output and opposed one end surface of the light guide body, the desired diffusing function can be obtained.

As a result, even in the light signal transmitting device in which a diffusing area is provided on the incident side for the signal light, reliability of connection with the optical fiber is improved.

The optical fiber, the light guide body, the light receiving element and the like may be fixed to the nodes on the output side for the signal light by light transmitting resin, or they may be bumped against the nodes, or they may be arranged on the nodes via a minute gap.

The connecting material can be arranged in a gap between one end of the optical fiber and one end surface of the light guide body. From a viewpoint of stability of the connection between the optical fiber and the light guide body, the connecting material is sometimes formed so as to seal at least a partial side surface of the optical fiber and the entire light guide body.

Further, an average particle diameter of the particles to be dispersed in the optical medium is set to be not less than a wavelength of the signal light. When the average particle diameter is set to be not less than the wavelength of the signal light, Mie scattering is dominant as diffusion of the incident signal by means of the particles. In the Mie scattering, forward scattering is dominant as scattering of light, and incident light can be transmitted to the other end of the light guide body while it is being diffused efficiently. Meanwhile, when the particle diameter is not more than the wavelength of the signal light, Rayleigh scattering, in which isotropic scattering is dominant, is dominant in diffusion, and thereby increasing transmission loss of the signal light to the other end of the light guide body. For this reason, in the invention, actually the average particle diameter of the dispersing particles is sometimes set to be not less than the wavelength of the signal light.

As the optical fiber to be connected, a plastic optical fiber is frequently used in view of connecting alignment tolerance with respect to the light guide body.

Further, a second aspect of the invention is a signal processing device including: the light signal transmitting device; a light emitting element for emitting a light signal according to an electric signal to the other end of the optical fiber or a light receiving element for converting the light signal received from the other end of the optical fiber into an electric signal; and an electric circuit for processing the electric signal.

With this configuration, in the signal processing device using the light signal transmitting device where the diffusing area is provided on the incident side for the signal light, diffusing performance and connecting reliability become high.

BRIEF DESCRIPTION OF THE DRAWINGS

FIG. 1 is a schematic constitution diagram of a transmission type optical star coupler according to a first embodiment of the present invention.

FIG. 5 is a perspective view of the optical wiring board according to the third embodiment of the invention.

FIG. 6 is a sectional view of the signal processing device according to a fourth embodiment of the invention.

FIG. 7 is a perspective view of the optical wiring board laminator according to the fourth embodiment of the invention.

DETAILED DESCRIPTION OF THE INVENTION

Figure 2:
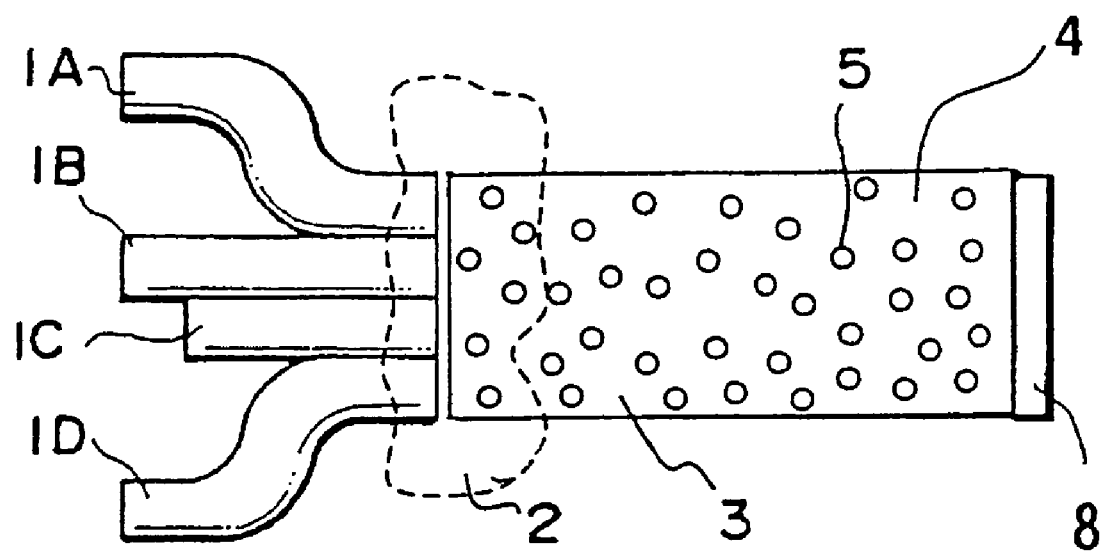
FIG. 2 is a schematic constitution diagram of a reflection type optical star coupler according to a second embodiment of the invention.

Embodiments of the present invention are explained below with reference to the drawings.

[First Embodiment]

FIG. 1 illustrates an optical star coupler according to a first embodiment. The first embodiment shows an optical star coupler of 4 by 4. As shown in FIG. 1, the optical star coupler has an optical fiber array where one ends of four optical fibers 1A to 1D and optical fibers 7A to 7D are arranged in a line. The optical fiber array is connected with a particle dispersing light guide body 3 of the invention formed into a rectangular plate shape, with the gaps between both end surfaces and the optical fibers included, by applying an optically transparent resin particle 2 to the entire light guide body. Signal light is input by using a surface light emitting laser (not shown) for generating an infrared ray (wavelength: 780 nm) provided on the other ends of the optical fibers.

As the particle dispersing light guide body 3, a material, in which spherical silicone resin particles 5 having refraction index of 1.438 and average particle diameter of 7 μm are dispersed in a PMMA (polymethyl methacrylate) base member 4 having refraction index of 1.485, is used, for example.

As an adhesive material for the optical fibers 1 and 7 and the particle dispersing light guide body 3, ultraviolet curing acrylic adhesive (AT6001: NTT Advanced Technology Corporation) having refractive index of 1.51 approximate to that of PMMA is used here. Another connecting materials include ultraviolet curing epoxy adhesive (AT7602: NTT Advanced Technology Corporation) and the like.

According to this embodiment, signal light transmitted from a light emitting element via the optical fiber 1A enters the particle dispersing light guide body 3. The incident signal light is scattered forward by resin particles 5 dispersed in the particle dispersing light guide body, and simultaneously is totally reflected from upper and lower surfaces and side surfaces of the particle dispersing light guide body repeatedly. While the forward scattering and total reflection, the signal light is propagated to an end surface opposed to an end surface where the signal light enters with an approximately uniform light intensity distribution so as to be emitted via the optical fibers 7A to 7D.

The optical star coupler includes a rectangular sheet of 4×20×1 (w×l×t) mm, which is produced by using the particle dispersing light guide body (average particle diameter of the silicone resin particles: 7 μm, resin density: 30000 pieces/mm$^3$), and an SI (step index) type POF (plastic optical fiber) having a fiber diameter of φ1 mm and a length (one side) of 300 mm (for example, CK-40 made by Mitsubishi Rayon Co., Ltd.). Uniformity of an emitted light quantity in such an optical star coupler is about 6% which is a satisfactory result. It is defined that uniformity (%) of an emitted light quantity=maximum emitting efficiency−minimum emitting efficiency/maximum emitting efficiency+ minimum emitting efficiency.

As the base member 4 of the particle dispersing light guide body 3, a material having high transmittance and comparatively high refractive index is mostly used. Besides PMMA, for example, polycarbonate and polyolefin can be used. Further, as the material 5 of the resin particles to be dispersed, a material, in which transparency is high and a difference in refractive index from that of the base material is 0.01 or more, is mostly used. Besides the silicone resin, a resin, which is obtained by polymerizing methyl methacrylate and divinylbenzene and has a crosslinked structure, such as polyester or polyethylene can be used.

A size of the resin particles to be dispersed is mostly set to a value in a range from a wavelength or more of the signal light to a value 1000 or less times as large as the wavelength. Actually, the size may be set to a value 1 to 30 times as large as the wavelength.

When the size of the resin particles to be dispersed exceeds a value 1000 times as large as the wavelength, lateral scattering is predominant, and thus transmission loss of the signal increases. Concretely, when an infrared ray having wavelength of 850 nm is used as the signal light, the size may be set to a value in a range of 0.8 μm to 250 μm.

A number and a type of the optical fibers composing the optical star coupler are not limited to the embodiment. The optical star coupler is composed of an arbitrary number of the optical fibers that comply with a requirement of a system. The type is not limited to POF, and a quartz fiber and HPCF (hard plastic clad fibers) can be used. The periphery of the rectangular sheet is covered with a member, which has a smaller refractive index than that of the base member of the particle dispersing light guide body (for example, fluorine-contained resin) so as to constitute the optical fiber.

[Second Embodiment]

FIG. 2 illustrates a reflection type optical star coupler according to a second embodiment. The second embodiment shows a four-branched optical star coupler. As shown in FIG. 2, the optical fiber array in which one ends of the four optical fibers 1A to 1D are arranged in a line is optically connected with the particle dispersing light guide body of the invention formed into the rectangular plate shape. Further, a reflecting unit 8 is provided on an end of the particle dispersing light guide body of the invention formed into the rectangular plate shape opposite to an end connected with the optical fiber array. The resin 2, which connects the particle dispersing light guide body 3, the optical fibers and a gap of the light guide body, is the same as that in the first embodiment, but the resin is applied only to the periphery of the gap.

According to this embodiment, the signal light which is transmitted from the light emitting element via the optical fiber 1A enters the particle dispersing light guide body 3. The incident signal light is scattered forward by the resin 5 dispersed in the particle dispersing light guide path, and simultaneously while the signal light is being totally reflected from the upper and lower surfaces and the side surfaces of the particle dispersing light guide body repeatedly, it is propagated. The signal light is reflected by the reflecting unit 8 on the end of the particle dispersing light guide body opposite to the end connected with the optical fiber array, and it is again totally reflected from the upper and lower surfaces and the side surfaces of the particle dispersing light guide body repeatedly. While the total reflection, the signal light is propagated to the end surface where it enters with an approximately uniform light intensity distribution so as to be emitted via the optical fibers 1A to 1D.

The reflection type optical star coupler is composed of the rectangular particle dispersing light guide body and the SI type POF, and a reflecting surface made of Al or the like is formed directly on the end opposite to the end connected with POF by sputtering.

A number and a type of the optical fibers composing the optical star coupler are not limited to this embodiment or the first embodiment.

[Third Embodiment]

Figure 3:
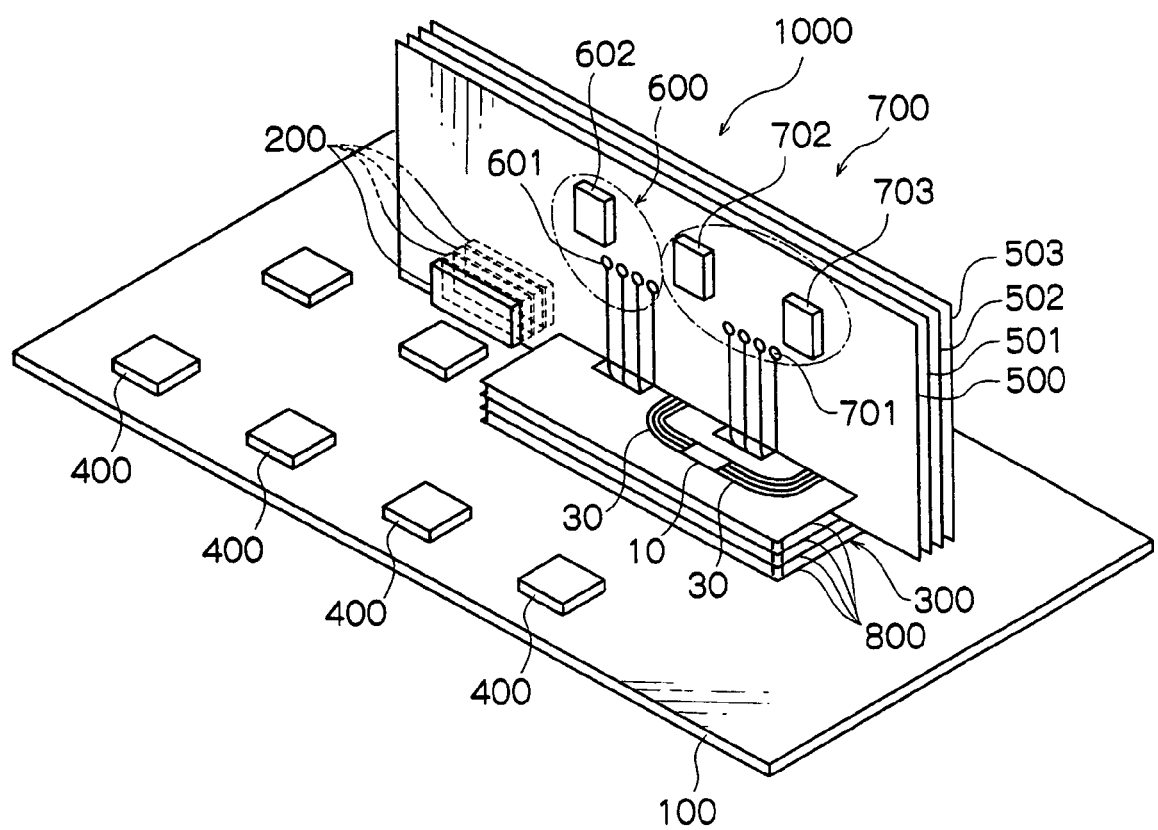
FIG. 3 is a perspective view of a signal processing device according to a third embodiment of the invention.

A third embodiment of the invention is explained with reference to FIGS. 3 to 5. FIG. 3 is a schematic constitution perspective view of a signal processing device according to the embodiment. As shown in the drawing, in a signal processing device 1000, the optical star coupler 10 similar to that explained in the first embodiment is arranged and fixed to an optical wiring board base 800 in a predetermined position of a supporting substrate 100. The ends of the optical fibers and the light guide body 3 are sealed and fixed by the light transmitting resin (connecting material) 2. A plurality of electric connectors 200 are annexed on a predetermined position of the supporting substrate 100 with predetermined intervals, and a plurality of circuit boards 500, 501, 502 and 503 which are optically connected by the optical star coupler 10 are attached to the electric connectors 200. Further, electronic circuits 400, a power source line and electric wiring for transmitting an electric signal (not shown) are provided to predetermined positions of the supporting substrate 100. The electric wiring is electrically connected with electronic circuits (not shown) on the circuit boards 500, 501, 502 and 503 attached via the electric connectors 200.

The circuit boards 501, 502 and 503 have an electrical-optical converting circuit 600 as a "light transmitting circuit" for converting an electric signal into a light signal, and an optical-electrical converting circuit 700 as a "light receiving circuit" for converting a light signal into an electric signal. The former electrical-optical converting circuit 600 is composed of, as one example, laser diodes 601 as "light emitting elements" and a laser diode driving circuit 602. The electrical-optical converting circuit 700 is composed of, as one example, photodiodes 701 as "light receiving elements", a photodiode driving circuit 702, and an amplifying circuit 703 for amplifying a light receiving signal in the photodiodes 701 to a level where this signal can be converted as a logical signal.

An optical bus circuit 1000 shown in FIG. 3 is such that a number of the circuit boards to be connected is four and a number of channels (a number of bits) is four. In such a case where the bus is composed of a plurality of channels, a plurality of the optical star couplers 10 explained above are used.

Figure 4:
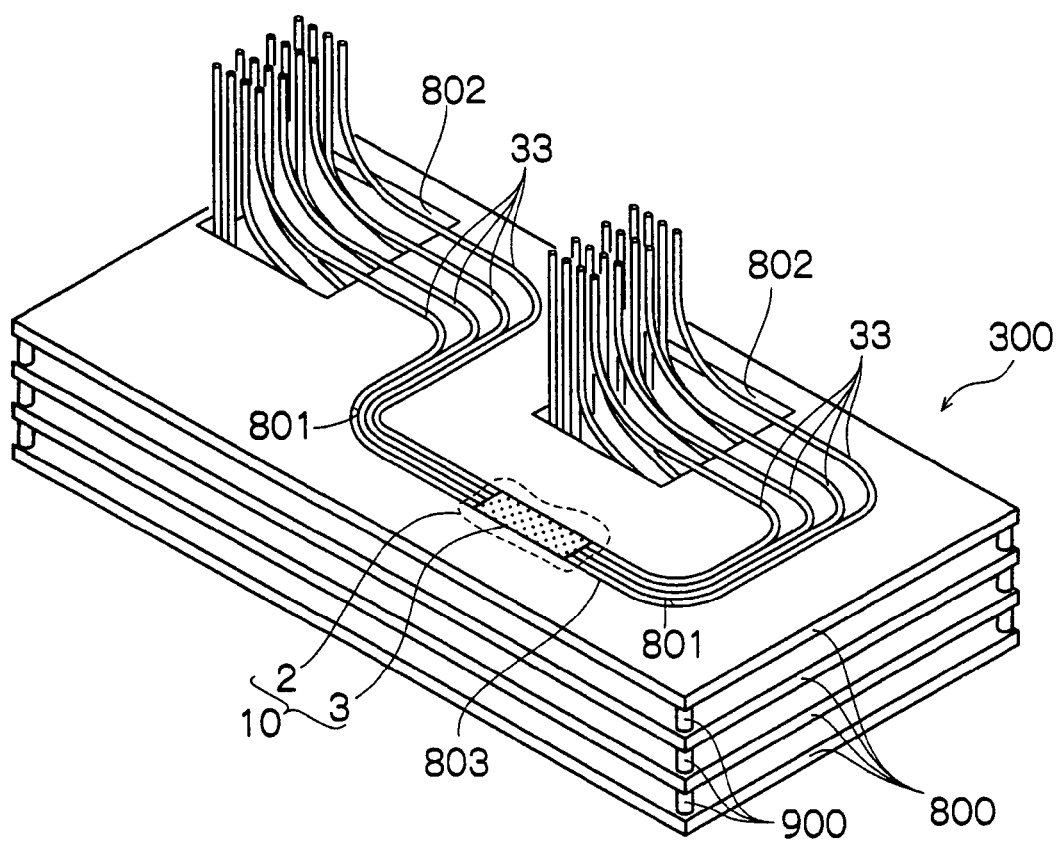
FIG. 4 is a perspective view of an optical wiring board laminator according to the third embodiment of the invention.

Further, as shown in FIG. 4, four optical wiring boards mounted with the optical star coupler 10 are laminated in accordance with that a number of the channels is four.

As shown in FIG. 5, the optical star coupler is embedded in the optical wiring boards. As a POF core wire 33, for example, a POF core wire with a diameter of 1 mm is used. "The optical fiber core wire" is a core material itself in which a coating layer is not formed from an optical fiber. The particle dispersing light guide path 3 is a rectangular sheet of 4×20×1 (w×l×t) mm. As the optical wiring board base 800, for example, a PMMA board with a thickness of about 2 mm is used. By cutting a surface of the optical wiring board base 800, a groove having a depth of 1 mm and a width of 1 mm to 4 mm, in which the POF core wire 33 and the rectangular sheet are arranged, is formed.

Besides PMMA, for example, a plastic material made of PC (polycarbonate) or polyolefin is used as the optical wiring board base 800, and the optical wiring board base 800 can be produced by injection molding instead of cutting. The material of the optical wiring board base 800 is not limited to the plastic material, and it may be formed by cutting metal such as Al.

[Fourth Embodiment]

A fourth embodiment of the invention is explained with reference to FIGS. 6 to 8. As shown in FIGS. 6 and 7, the signal processing device is composed of an optical wiring board laminator 12 and a plurality of circuit boards 14. The optical wiring board laminator 12 has a plurality of optical wiring boards (in this embodiment, eight optical wiring boards) formed into a sheet form, and the optical wiring boards 16 are laminated in a direction of a sheet side surface. The circuit boards 14 are optically connected with the optical wiring boards 16.

The particle dispersing light guide body, a first groove 38 for housing first optical fibers 36, and a groove 42 for housing second optical fibers are formed in the optical wiring board base 28 according to their forms and arrangements. The particle dispersing light guide body 3, the first optical fibers 36 and the second optical fibers 40 are embedded in the optical wiring board base 28.

Second locating members 48 are used for holding one ends 36a of the first optical fibers 36 and one ends 40a of the second optical fibers properly in position to the particle dispersing light guide body 3. A locating hole 50 is formed on the second locating members 48. The one ends 36a of the first optical fibers 36 and the one ends 40a of the second optical fibers are inserted into the locating groove 50 so as to be opposed to the particle dispersing light guide body 3. After the optical fibers 36 and the light guide body 44 are pre-located in such a manner, the curing resin 2 is applied to between the optical fibers and the light guide body in order to seal and fix them.

One ends 36a of the first optical fibers 36 extend to rear surfaces 26 of the optical wiring boards 16 and are bent so as to extend to upper surfaces 20 of the optical wiring boards 16. The one ends 40a of the second optical fibers 40 extend to front surfaces 24 of the optical wiring boards 16 and are bent so as to extend to the upper surfaces 20 of the optical wiring boards 16. The other ends 36b and 40b connected with the one ends 36a and 40a, respectively, face the upper surface 20 of the optical wiring boards 16, for example. In other words, the other ends 36b and 40b of the first optical fibers 36 and the second optical fibers 40 are present in vicinities of one surface of the optical wiring boards 16 and may be arranged in a position where they can be optically connected with the circuit boards 14.

In order to bump the other ends 36b of the first optical fibers 36 and the other ends 40b of the second optical fibers 40 properly against the circuit boards 14, a locating member 30 is provided. Locating holes 52 are formed on the locating member 30. The other ends 36b of the optical fibers 36 and the other ends 40b of the second optical fibers 40 are inserted into the locating holes 52.

In this embodiment, the eight optical wiring boards 16 are laminated. The other ends 36b of the first optical fibers 36 and the other ends 40b of the second optical fibers 40 are arranged so as to be regularly in a line to a surface direction and a laminated direction of the optical wiring boards 16. The circuit boards 14 are connected to a direction directing to the laminated direction of the optical wiring boards 16 and receive/transmit a light signal of 8 bits with the optical wiring board laminator 12.

Figure 8:
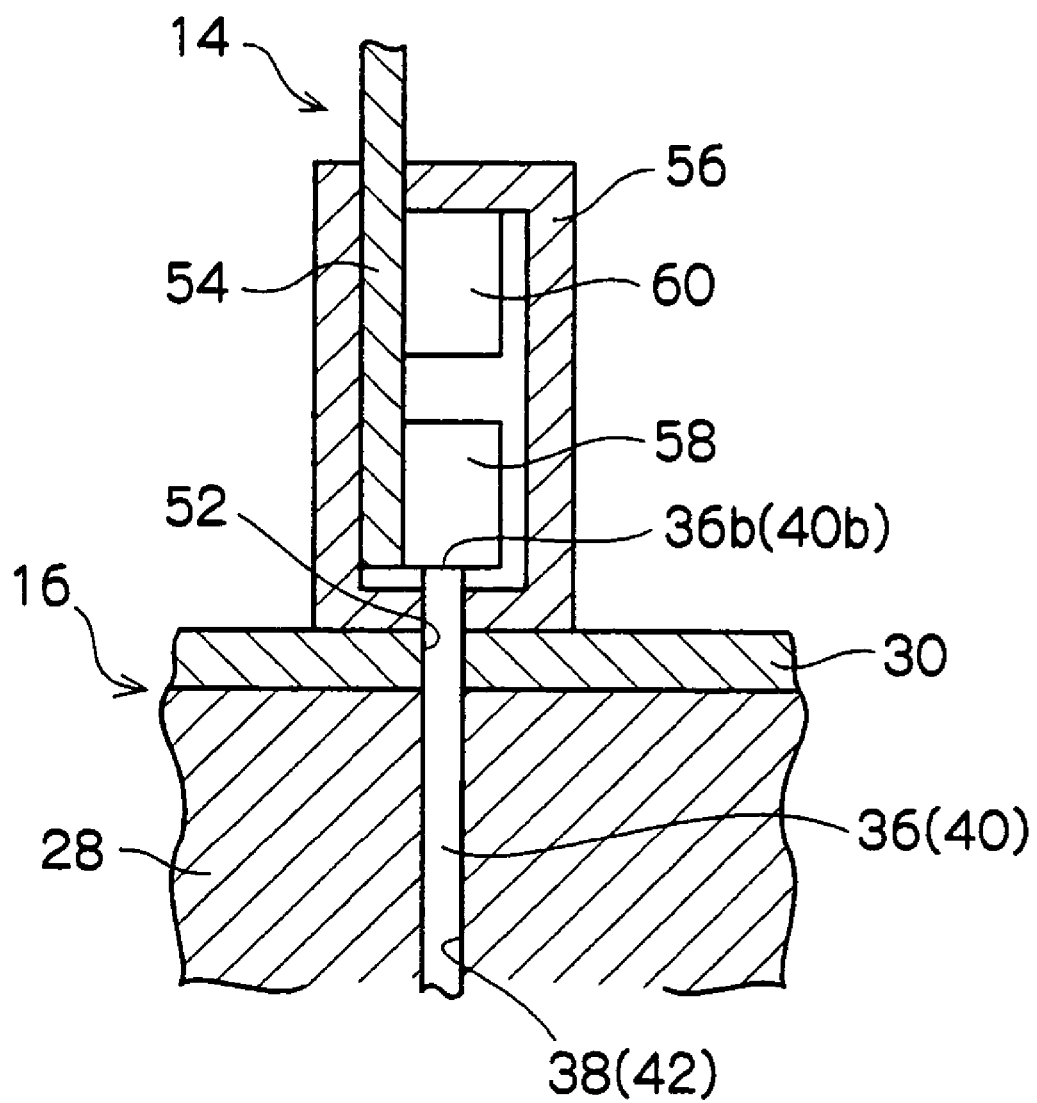
FIG. 8 is a sectional view of a connecting portion (optical connector) between the optical wiring board and the circuit board according to the fourth embodiment of the invention.

FIG. 8 illustrates the connected configuration of the circuit boards 14 and the optical wiring boards 16. The circuit boards 14 have an electric wiring board 54, and an optical connector 56 provided on one end of the electric wiring board 54. An optical-electrical converting element 58 and a driving circuit 60 for driving the optical-electrical converting element 58 are provided on a surface of the electric wiring board 54. The optical-electrical converting element 58 is a light receiving element or a light emitting element. The optical-electrical converting element 58 is arranged on an end of the electric wiring board 54, and its light receiving or light emitting surface bumps against the other end 36b of the first optical fiber 36 and the other end 40b of the second optical fiber 40 to connect optically. When optical coupling loss is sufficiently small, a gap may be present between the other end 36b of the first optical fiber 36, the other end 40b of the second optical fiber 40 and the optical-electrical converting element 58.

In this embodiment, an optical fiber core wire can be used for the first optical fiber 36 and the second optical fiber 40. As the optical wiring board base 18, a plastic material such as PMMA, PC or polyolefin is used, and it is produced by cutting or injection molding. The optical wiring board base 18 is not limited to the plastic material, and it can be formed by cutting metal made of Al, for example.

[Fifth Embodiment]

Figure 9:
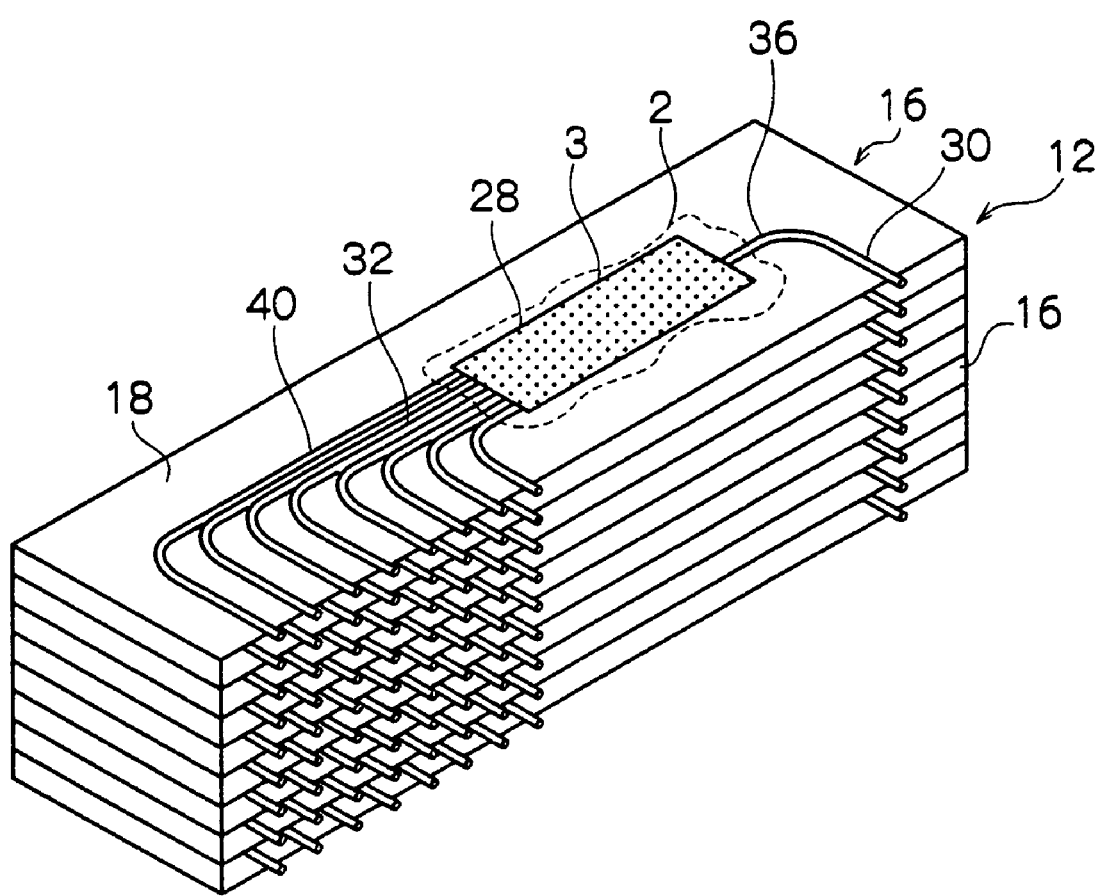
FIG. 9 is a perspective view of the optical wiring board laminator according to a fifth embodiment of the invention.
Figure 10:
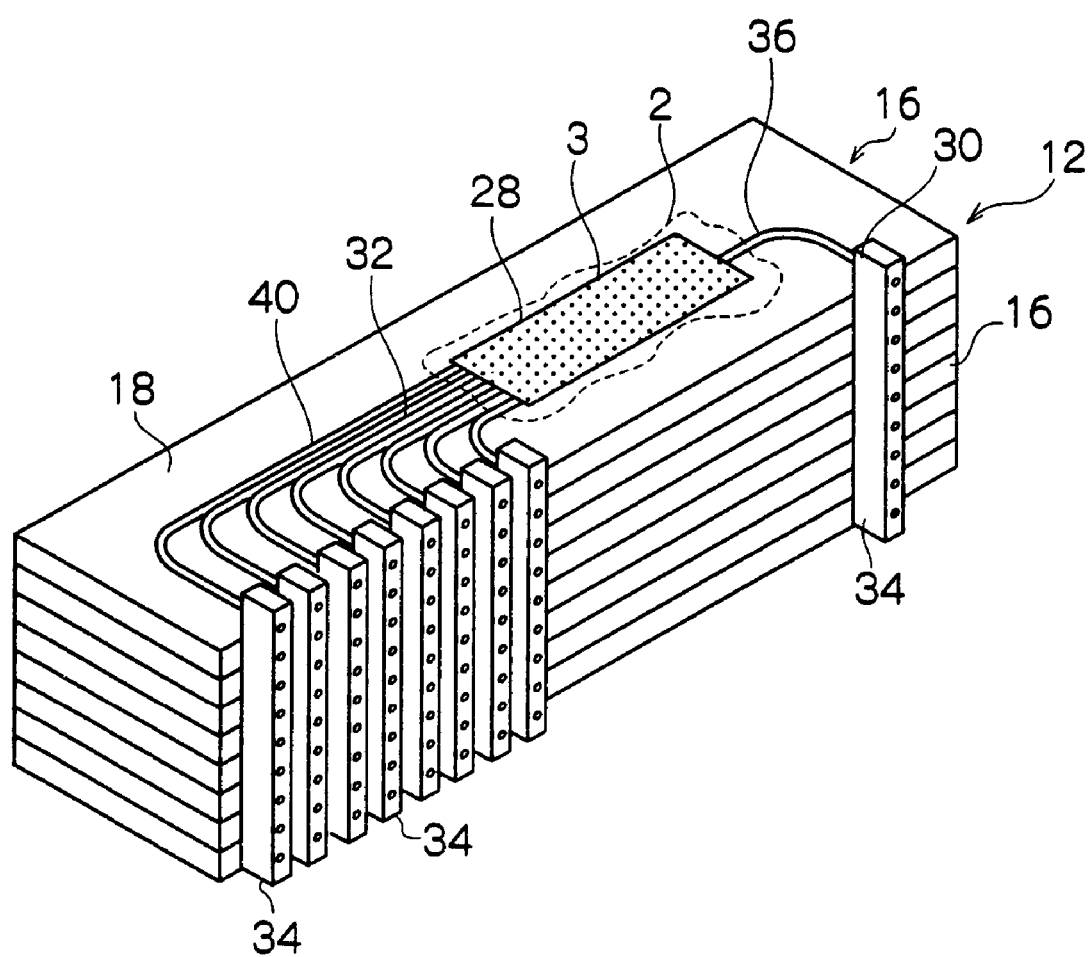
FIG. 10 is a perspective view of a ferrule connecting portion of the optical wiring board laminator according to the fifth embodiment of the invention.

A fifth embodiment of the invention is explained with reference to FIGS. 9 to 11. The embodiment explains a method of fixing the other end of the first optical fiber and the other end of the second optical fiber in the optical wiring board laminator used in the signal processing device described in the fourth embodiment.

The first optical fiber 36 is wired along a first optical fiber housing groove 30, and one end of the first optical fiber 36 is connected with a center on one end surface of the particle dispersing light guide body 3 via the curing resin for connecting. The second optical fibers 40 are wired along second optical fiber housing grooves 32, and one ends of the second optical fibers 40 are connected with the other end surface of the particle dispersing light guide body 3 on a side opposite to the first optical fiber 36 via the curing resin for connecting. The other ends of the first optical fiber 36 and the second optical fibers 40 protrude from the optical wiring board 18, and are fixed to ferrules 34, mentioned later.

The particle dispersing light guide body 3, the first optical fiber 36 and the second optical fibers 40 are fixed to the optical wiring board 18 in a following manner in this embodiment. They are embedded in a particle dispersing light guide path housing groove 28, the first optical fiber housing groove 30 and the second optical fiber housing grooves 32 so as to be sandwiched by the optical wiring boards 18. The fixing manner is not, however, limited to this. For example, the particle dispersing light guide body 3, the first optical fiber 36 and the second optical fibers 40 can be fixed to the optical wiring board base by providing fixing members.

The ferrules 34 are provided along the laminated direction of the optical wiring boards 18, and optical fiber fixing holes are formed on the ferrules 34. The other end(s) of the first optical fiber 36 or the second optical fibers 40 is (are)

inserted and fixed into the optical fiber fixing hole. A locating hole, through which the other end(s) of the first optical fiber 36 or the second optical fibers 40 is (are) inserted, may be formed on the ferrule 34, or a V-shaped groove may be provided on the ferrule in order to locate and fix the other end(s) of the first optical fiber 36 or the second optical fibers 40.

Figure 11:
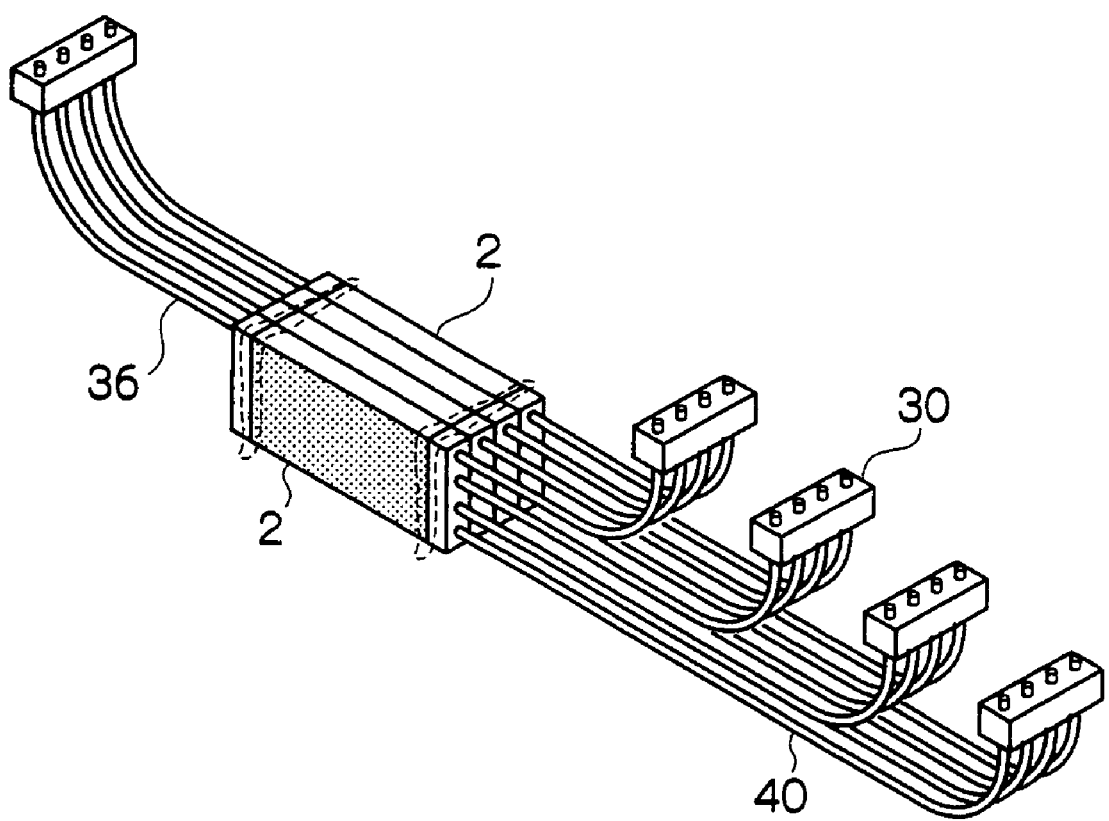
FIG. 11 is a perspective view illustrating a modified example of the optical wiring board laminator according to the fifth embodiment of the invention.

FIG. 11 illustrates a modified example of the optical wiring board laminator. The other end(s) of the first optical fiber 36 or the second optical fibers 40 is (are) fixed to the ferrules 30. Because the other ends are connected with the optical connectors 56 on the circuit boards 14 by the ferrules, the optical wiring board base 18 is partially omitted.

[Sixth Embodiment]

Figure 12:
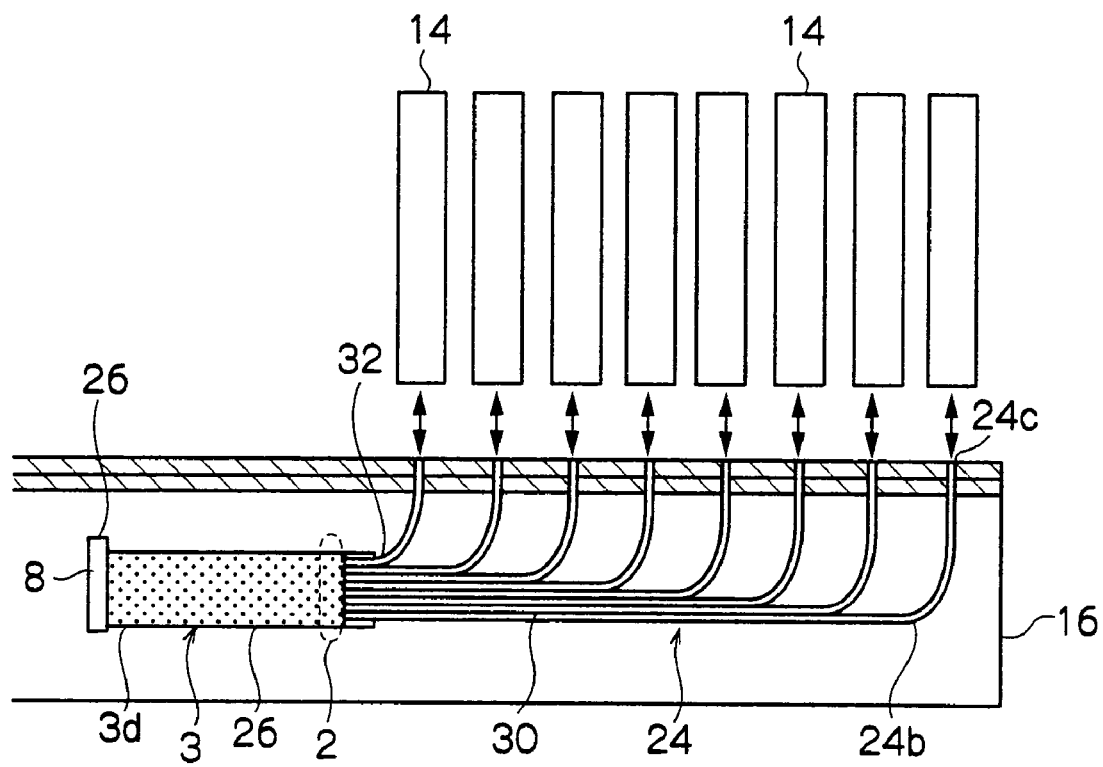
FIG. 12 is a sectional view of the signal processing device according to a sixth embodiment of the invention.
Figure 13:
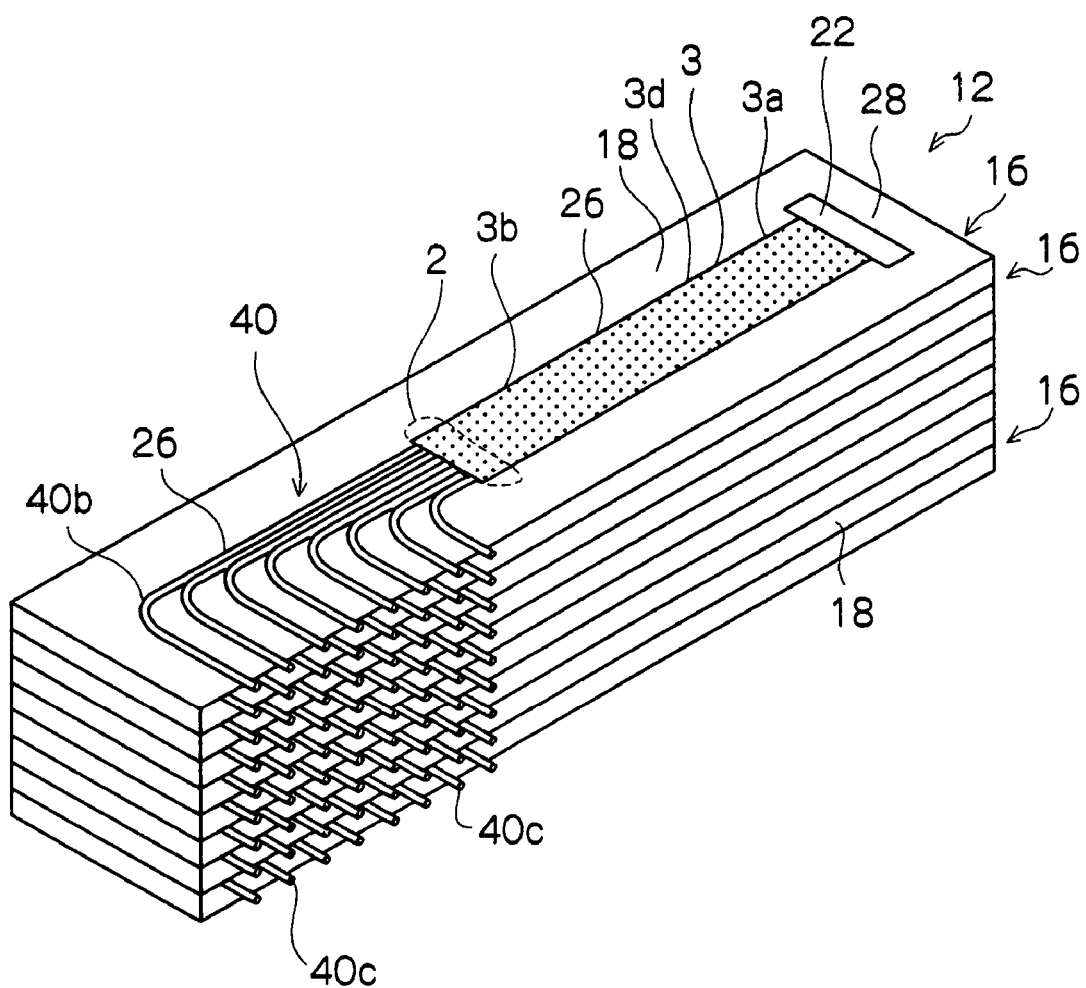
FIG. 13 is a perspective view of the optical wiring board laminator according to the sixth embodiment of the invention.

A sixth embodiment of the invention is explained with reference to FIGS. 12 and 13. In this embodiment, the optical wiring boards used in the signal processing device are composed of the optical fiber array 40 made of a plurality of optical fibers optically connected with one end surface of the particle dispersing light guide body 3, and the light reflecting unit 8 provided on the other end surface.

A particle dispersing light guide body medium housing groove 26 for the particle dispersing light guide body 3, a reflecting portion housing groove 28 for housing a reflecting portion 22, and the optical fiber housing groove 30 for housing the optical fibers 40 are formed on one surface of the optical wiring board base 18. Further, the optical fiber housing groove 30 is formed so as to be connected with a light transmitting medium housing groove 26 on a side opposite to the reflecting portion housing groove 28. The reflecting portion 8 is allowed to bump against a first end surface 3a of the particle dispersing light guide body 3, and closely fixed to the particle dispersing light guide body 3. The reflecting portion 8 may be, formed integrally with the particle dispersing light guide body 3 via adhesive or the like.

In this embodiment, although the particle dispersing light guide body and the reflecting portion 8 are provided separately, the reflecting portion 8 may be formed directly on the one end surface of the particle dispersing light guide body. A1 is used in order to form the reflection portion directly by sputtering or vapor deposition.

By housing the optical fibers 40 in the optical fiber housing groove 30 of the optical wiring board base 18, one end of the optical fiber 40 is arranged so as to be opposed to a second end surface 3b of the particle dispersing light guide body 3, and they are optically connected via the light transmitting curing resin 2 with the gap between the one end and the light guide body 3 being included. The optical fibers 40 are fixed in a bundle form to the connected portion by one end fixing member. The optical fibers 40 have bent portions 40b which are bent upward so as to have a predetermined radius of curvature, and the other ends 40c of the optical fibers 40 which extend from the one ends via the bent portions 40b face the upper surfaces of the optical wiring boards as mentioned above. The other ends 40c of the optical fibers 40 are inserted and fixed into an other end fixing member 34 provided on the upper surface of the optical wiring board, so as to be connected with optical-electrical converting elements of the circuit boards 14. One ends of the circuit boards 14 have optical connectors, and the optical-electrical converting elements in the optical connectors bump against the other ends 40c of the optical fibers 40, respectively, in order to connect optically.

In this embodiment, the eight optical wiring boards are laminated, the other ends 40c of the optical fibers 40 are arranged regularly in a line to the sheet direction and the laminated direction of the optical wiring boards. The circuit boards 14 are connected to the direction directing to the laminated direction of the optical wiring boards so as to receive and transmit a light signal of 8 bits to/from the optical wiring board laminator 12.

In the above configuration, light output from an arbitrary optical-electrical converting element of the circuit board 14 is input from the other end 40c of either optical fiber connected with the optical-electrical converting element into the optical wiring board. The input light is entered into the particle dispersing light guide body 3 via the optical fiber 40, reflected by the reflecting portion 8, and again propagated to the particle dispersing light guide body 3 so as to be output to the circuit board 14 via another optical fiber 40.

The light signal transmitting device and the signal processing device described in the embodiments can be applied to, for example, an in-circuit emulator (ICE), a radio communication equipment, a server device and the like.

A signal can be optically transmitted between components such as a CPU, a memory, and an internal LSI of the in-circuit emulator by the light signal transmitting device and the signal processing device in the embodiments. As a result, delay of signal transmission can be suppressed, and the speed of signal transmission can be increased. Further, the signal is optically transmitted between the internal components in order to prevent distortion of a signal waveform due to ringing and a reflected wave, thereby making timing verification by means of emulation accurate.

Further, many base stations and exchanges stations are connected via a network, and the base stations transmit and receive signals to/from mobile stations (mobile phones) via a radio communication line. In a mobile communication system such as a mobile phone, many wirings are required for connecting a transmitter-receiver and the signal processing device, and a number of pins of a connector for connecting the boards of the transmitter-receiver and the signal processing device with a case increases according to a wiring quantity. In the base station of such a mobile communication system, the optical star coupler, the optical wiring boards and the light signal transmitting device described in the embodiments are used. As a result, a number of wirings between the device for processing a signal and the device for transmitting/receiving a radio signal can be reduced. Further, a pin neck of a connector for fixing the signal processing device and the radio signal transmitting/receiving device to a back panel is omitted. Consequently, the radio communication device with a reduced force required for punching can be obtained.

In a prior server system constituted by electric transmission, a transmission speed is limited, and thus it is hard to reduce a number of bits (a number of signal lines, a number of control lines and the like). This causes enlargement of the device. The light signal transmitting device and the signal processing device described in the embodiments are used in such a server system, thereby enabling high-speed signal transmission, and a larger scale of the system is structured. For this reason, an optical server system which connects a plurality of cabinets can be provided.

As explained above, as to the light signal transmitting device of the invention, even in a light signal transmitting device in which a diffusing area is provided on an incident side for signal light, reliability of connection to optical fibers can be improved.

Further, according to the light signal transmitting device of the invention, an optical bus system, in which resistance to environmental conditions such as temperature change and dust is good, can be constituted.

What is claimed is:

1. A light signal transmitting device for allowing signal light entering from one end of at least one optical fiber on an incident side to enter a light guide body, and emitting the signal light towards a plurality of output nodes and including a light transmitting connecting material for optically connecting the optical fiber with one end surface of the light guide body, wherein the light guide body is constituted so that particles for scattering the signal light are dispersed in an optical medium; wherein the connecting material is provided at least in an area including a partial side surface of the optical fiber, a gap between the optical fiber and the light guide body, and a portion of the light guide body.

2. A light signal transmitting device according to claim 1, wherein a refractive index of the connecting material has a value within a range of 1.45 to 1.57.

3. A light signal transmitting device according to claim 1, wherein the connecting material is provided at least in an area including a partial side surface of the optical fiber and the entire light guide body, and the gap is sealed by the connecting material.

4. A light signal transmitting device according to claim 1, wherein an average particle diameter of the particles is not less than a wavelength of the signal light transmitted by the light guide body.

5. A light signal transmitting device according to claim 1, wherein the optical fiber is a plastic optical fiber.

6. A light signal transmitting device according to claim 1, wherein the light guide body has a rectangular shape.

7. A light signal transmitting device according to claim 1, wherein a plurality of optical fibers are provided.

8. A light signal transmitting device according to claim 1, wherein the other end of the light guide body has a reflecting unit.

9. A light signal transmitting device according to claim 8, further comprising an optical fiber connected with the other end of the light guide body.

10. A signal processing device, comprising:
a light signal transmitting device for allowing signal light entering from one end of at least one optical fiber on an incident side to enter a light guide body, and emitting the signal light towards a plurality of output nodes and including a light transmitting connecting material for optically connecting the optical fiber with one end surface of the light guide body, wherein the light guide body is constituted so that particles for scattering the signal light are dispersed in an optical medium;
a light emitting element for emitting a light signal according to an electric signal to an end of an optical fiber or a light receiving element for converting the light signal received from the other end of the optical fiber into an electric signal; and
an electric circuit for processing the electric signal; wherein the connecting material is provided at least in an area including a partial side surface of the optical fiber, a gap between the optical fiber and the light guide body, and a portion of the light guide body.

11. A signal processing device according to claim 10, wherein a refractive index of the connecting material has a value within a range of 1.45 to 1.57.

12. A signal processing device according to claim 10, wherein the connecting material is provided at least in an area including a partial side surface of the optical fiber and the entire light guide body, and the gap is sealed by the connecting material.

13. A signal processing device according to claim 12, wherein an average particle diameter of the particles is not less than a wavelength of the signal light transmitted by the light guide body.

14. A signal processing device according to claim 13, wherein the optical fiber is a plastic optical fiber.

15. A signal processing device according to claim 10, wherein the light guide body has a rectangular shape.

16. A signal processing device according to claim 15, wherein a plurality of optical fibers are provided.

17. A signal processing device according to claim 10, wherein the other end of the light guide body has a reflecting unit.

18. A signal processing device according to claim 17, further comprising an optical fiber connected with the other end of the light guide body.

* * * * *